United States Patent [19]

Limque et al.

[11] 4,221,561
[45] Sep. 9, 1980

[54] ALUMINUM SOLDERING FURNACE

[75] Inventors: Ferdinand Limque, Berg en Dal, Netherlands; Hans Bertrand, Goch, Fed. Rep. of Germany

[73] Assignee: Ipsen Industries International, Gesellschaft mit beschränkter Haftung, Kleve, Fed. Rep. of Germany

[21] Appl. No.: 949,050

[22] Filed: Oct. 6, 1978

[30] Foreign Application Priority Data

Oct. 12, 1977 [DE] Fed. Rep. of Germany ....... 2745772

[51] Int. Cl.² .................................................. F27B 9/02
[52] U.S. Cl. .................................... 432/128; 432/209
[58] Field of Search .............. 432/147, 148, 120, 209, 432/205, 128; 219/85 R, 85 BA, 456, 386, 403, 404

[56] References Cited

U.S. PATENT DOCUMENTS

| 2,311,908 | 2/1943 | Vranken | 432/128 |
| 2,688,685 | 9/1954 | Goodell | 219/403 |
| 3,112,919 | 12/1963 | Gunow | 432/205 |
| 3,279,350 | 10/1966 | Kaplan | 219/403 |
| 3,982,887 | 9/1976 | Kendziora et al. | 432/128 |
| 3,982,889 | 9/1976 | Olson | 432/128 |

*Primary Examiner*—John J. Camby
*Attorney, Agent, or Firm*—Martin A. Farber

[57] ABSTRACT

A vacuum aluminum soldering furnace comprising an evacuatable soldering chamber having two lateral heating zones. The soldering chamber has a middle heating zone arranged parallel to the lateral heating zones and the heating element of the middle heating zone is preferably arranged removable from the soldering chamber.

8 Claims, 2 Drawing Figures

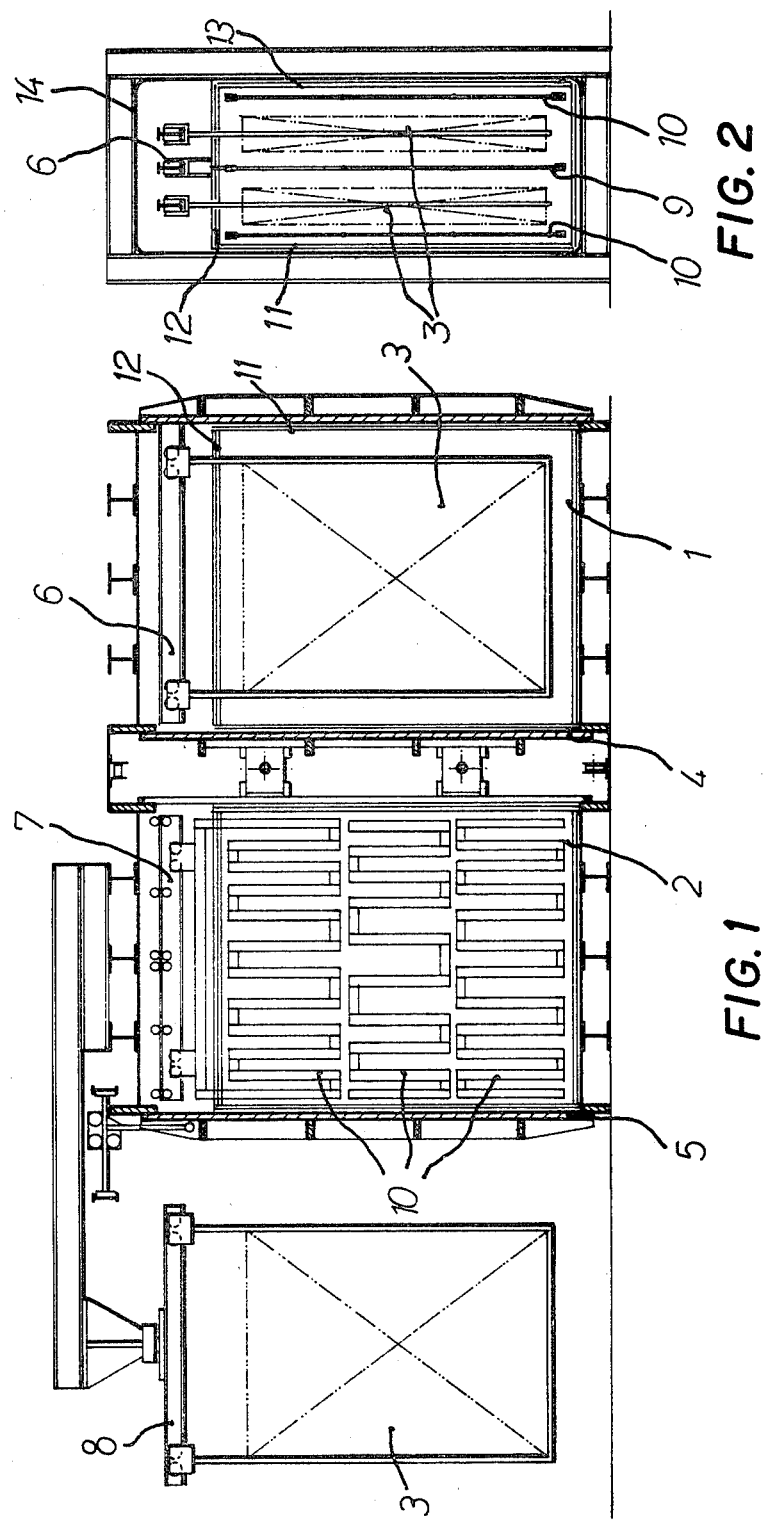

ALUMINUM SOLDERING FURNACE

The invention relates to a vacuum-aluminum soldering furnace, comprising an evacuatable soldering chamber which has two lateral heating zones.

Aluminum-soldering furnaces with two lateral heating zones in the heating chamber are known. In this manner a charging cage is received between the heating zones. It is disadvantageous that an adjustment of the size of the soldering chamber to the size of the soldering parts is not possible. The band width of the soldering parts which are to be treated is relatively small due to the predetermined dimensions of the charging cage or frame, since this has a pregiven width. There exists however a need in existing furnaces to make a larger application width, in order with a single furnace to have the possibilities of variation with respect to the dimensions of the parts to be soldered from the smallest up to the largest sizes. Furthermore it is disadvantageous that is not always possible with two lateral heating zones to place parts which are to be soldered closely enough to the heating elements in order to obtain a uniform temperature distribution in the soldering chamber and on the part which is to be soldered. This is necessary for a good flow of soldering medium and a uniform formation of the soldered seam.

The invention is based on the task of developing a vacuum aluminum soldering furnace, which for the treatment of parts to be soldered is variably formed with respect to the spaces which stand available for use and the heating elements of which furnace are nevertheless placed as close as possible to the parts which are to be soldered.

The object of the invention is solved in the manner that the soldering chamber has a middle heating zone arranged parallel to the lateral heating zones, and that preferably the heating element of the middle heating zone is arranged removably from the soldering chamber. In this manner the possibility is provided that instead of the heretofore conventional charging in one cage or frame, two cages are used or a single larger cage is used which practically fills up the entire space of the soldering chamber and consequently it is suited for receiving larger soldering parts. The soldering furnace consequently is variably shaped with respect to its treatment space which stands available for use. With respect to the dimensions of the parts to be soldered, there results a larger application width. A uniform temperature distribution is attained by the possible adjustment of the heating zones to the conditions of the charge.

Purposefully the heating element of the center heating zone is moveably suspended on an overhead rail and is able to move out from the soldering chamber. This advantageous formation of the invention permits a simple removal of the center heating element from the soldering chamber in the event of necessity. In this manner the overhead rail can be a telescopic rail.

According to an advantageous embodiment of the aluminum soldering furnace in accordance with the invention, the soldering chamber has a box-shaped chamber housing, the latter being insulated with radiating sheet packets and having one or two gates, whereby a free space is left free over the chamber housing on the cover side up to the furnace housing, in which free space there are arranged the charge transport mechanism and the holder of the removeable center heating element. By this formation of the soldering chamber, in the unheated space between the housing cover and heating chamber cover, the different transport mechanisms are disposed protected, so that the transportation functions are not impaired even in continuous operation.

Preferably the vacuum aluminum soldering furnace of the invention is formed as a two chamber furnace with an evacuatable preheating chamber, the latter being connected to the soldering chamber by means of a vacuum-tight heat insulating intermediate gate or door, in which preheating chamber there are arranged telescopic head running rails for the automatic charging and discharging of the furnace, the head running rails being moveable in the longitudinal direction relative to the soldering chamber as well as relative to an outer-lying overhead transportation system. Particularly in this manner the intermediate gate can be mounted transversely moveable. In a modified embodiment, the soldering furnace of the invention is formed as a three chamber continuous-heating furnace with a prechamber, a soldering chamber and a discharge chamber connected one behind the other.

Further details, features and advantages of the subject of the invention are gathered from the following description of the corresponding drawing, in which there is schematically illustrated a vacuum aluminum soldering furnace in two chamber formation.

FIG. 1 of the drawing shows a side sectional view and

FIG. 2 of the drawing shows a front view into the soldering chamber of the furnace.

The illustrated automatic two chamber furnace comprises a soldering chamber 1, a preheating and purging chamber 2, respectively, and an overhead transportation system 8 for the charging cage or rack 3. The soldering chamber 1 is separated from the preheating chamber 2 by a vacuum-tight and heat-insulating door or gate 4, which gate is moveable in the transverse direction.

Each chamber 1, 2 comprises two heating zones for the reception of two charging cages 3, the heating zones being arranged next to one another, whereby heating elements 9 and 10 are arranged on the side walls (heating element 10) and in the middle (heating element 9) between the charging cages 3. The center heating element 9 is suspended on an overhead running rail 6 in the cold part of the heating chamber housing 13. This cold part results by a soldering- or heating chamber-housing 13, which housing above its cover wall 12 has a free space toward the furnace housing 14, in which furnace housing 14 the transportation system can be arranged. The box-shaped soldering chamber housing 13 is lined inside with radiating sheet or plate packets 11 and particularly indeed on the side walls, the bottom wall, the rear and intermediate gate wall as well as approximately 400 mm underneath the cover wall 12. Together they form the actual limits or boundaries of the soldering chamber 1.

For disassembling of the center heating element 9, the latter can be moved out from the soldering chamber. If the center heating element 9 is removed from the chamber, the width of the heating zone is doubled and correspondingly larger charging cages or holders can be moved in.

In the preheating chamber 2 there are disposed telescopic formed head running rails 7, which are moveable in the longitudinal direction to the soldering chamber 1 and to the outer-lying overhead transportation system 8. The latter serves for the automatic charging and discharging of the furnace. Between the soldering chamber 1 and the preheating chamber 2, a box-shaped intermediate gate housing is flanged on vacuum-tightly. The intermediate gate 4 comprises a. a vacuum-tight gate and b. a heat insulating radiating sheet packet which is located on each side of the gate. The intermediate gate is moveable transversely to the axis of the furnace for the opening and closing, respectively. Moreover both chambers 1 and 2 are provided with separate pump systems, which pump systems are suitable for evacuating (pumping-out) up to the high vacuum range.

The aluminum soldering furnace operates as follows:

First the soldering chamber 1 is evacuated up to the high vacuum range and is heated up to the soldering temperature. Then the front gate 5 of the preheating chamber 2 is opened laterally, transversely to the furnace axis, and the overhead telescopic rails 7 are moved out up to the outer-lying transportation system 8, on which transportation system the charging cages 3 have been brought loaded. The charging cages 3 are then shifted on the telescopic rails 7 and the latter move back into the preheating chamber 2. The front gate 5 is closed.

Then the preheating chamber 2 is evacuated and the heating is turned-on. After the charge is preheated to approximately 300° C. and the desired vacuum is achieved, the intermediate gate 4 is opened to the evacuated soldering chamber 1. Both chambers have the same vacuum.

The telescopic rails 7 up to the transportation system are moved out into the soldering chamber and the charging cages 3 are transported via the rails 7 into the soldering chamber 1. Subsequently the telescopic rails 7 are moved back into the preheating chamber 2 and the intermediate gate 4 is closed vacuum-tightly.

Now the charge is heated up to the soldering temperature and is maintained there for a corresponding time. After termination of the soldering holding time, the intermediate gate 4 is opened and the charge cage 3 or the charge cages 3 are moved into the prechamber 2. When the charge is cooled down there, the prechamber 2 can be discharged. If a cooling down is not necessary, the charge can be removed directly from the prechamber 2.

All transportation functions between the prechamber 2 and the soldering chamber 1 proceed automatically. The charging and discharging of the prechamber 2 can take place either automatically or manually.

In an extended embodiment the two chamber system can be enlarged by a third chamber in back of the soldering chamber 1, which third chamber then functions as a discharging chamber. In this manner the system can be run in continuously running operation and the performance or efficiency of the system is increased. As an alternative for lower performances or efficiencies, the furnace can be embodied even as a one chamber system comprising only the soldering chamber 1.

We claim:

1. Vacuum-aluminum soldering furnace, comprising:
    walls defining a horizontal type furnace of rectangular cross-section with an evacuatable vacuum sealable soldering chamber having two lateral heating zones,
    side heaters mounted on remote opposite sides of said walls at opposite remote sides of said two lateral heating zones, respectively, in said soldering chamber,
    said soldering chamber having a middle heating zone arranged parallel to and between said lateral heating zones,
    a laterally disposed openable gate vacuum-tight sealably disposed in said walls communicating with said soldering chamber,
    transport system means for moving a middle heating element horizontally into and out of the middle heating zone,
    a middle heating element of said middle heating zone being arranged on said transport system means horizontally removable from said soldering chamber,
    a work charging cage horizontally removeably disposed in the lateral heating zones, respectively, on both sides of said middle heating element between the latter and a respective one of said side heaters.

2. The vacuum-aluminum soldering furance, according to claim 1, wherein
    said transport system means includes a longitudinally moveable overhead rail horizontally mounted over said walls,
    said middle heating element of said middle heating zone is movably suspended on said overhead rail and is moveable out from said soldering chamber through said gate.

3. The vacuum-aluminum soldering furnace according to claim 2, wherein
    said overhead rail is a telescopic rail.

4. The vacuum-aluminum soldering furnace according to claim 1, further comprising
    a furnace housing disposed about said walls,
    said walls of said soldering chamber constitute a box-shape chamber housing with at least one of said gate,
    radiating sheet packets are disposed on and insulate said chamber housing,
    said chamber housing has a cover and defines thereabove a free space up to said furnace housing,
    said transport system means for holding said middle heating element,
    transportation means for moving each of said work charging cages,
    said transportation means and said transport system means for said middle heating element are arranged in said free space.

5. The vacuum-aluminum soldering furnace according to claim 4, wherein
    said transport system means constitutes an overhead rail for said middle heating element.

6. The vacuum-aluminum soldering furnace according to claim 1, wherein
    said walls form the furnace as a two chamber furnace including an evacuatable preheating chamber,
    a vacuum-tight thermally insulated intermediate gate connects said preheating chamber to said soldering chamber,
    rail means constituting telescopic head running rails are horizontally disposed in said preheating chamber for automatically charging and discharging the furnace with said charging cages through said intermediate gate,
    an outer overhead transportation system,
    said rail means are moveable in a longitudinal horizontal direction toward said soldering chamber as well as toward said outer overhead transportation system.

7. The vacuum-aluminum soldering furnace according to claim 6, wherein
said intermediate gate is transversely moveable relative to a furnace axis extending through said soldering chamber and said preheating chamber.

8. The vacuum-aluminum soldering furnace according to claim 1, wherein
said walls form the furnace as a three chamber continuous heating furnace having a preheating chamber, said soldering chamber and a discharge chamber connected one behind the other.

* * * * *